US008515801B2

(12) United States Patent
Guthrie

(10) Patent No.: US 8,515,801 B2
(45) Date of Patent: Aug. 20, 2013

(54) AUTOMATED METHODS AND APPARATUS FOR ANALYZING BUSINESS PROCESSES

(76) Inventor: Zachary Lane Guthrie, Greensboro, NC (US)

( * ) Notice: Subject to any disclaimer, the term of this patent is extended or adjusted under 35 U.S.C. 154(b) by 1165 days.

(21) Appl. No.: 12/106,924

(22) Filed: Apr. 21, 2008

(65) Prior Publication Data

US 2008/0262887 A1    Oct. 23, 2008

Related U.S. Application Data

(60) Provisional application No. 60/912,755, filed on Apr. 19, 2007.

(51) Int. Cl.
*G06Q 10/06*      (2012.01)
(52) U.S. Cl.
CPC ...................... *G06Q 10/06* (2013.01)
USPC .......................................................... 705/7.38
(58) Field of Classification Search
CPC ................................................. G06Q 10/0639
USPC ................................................... 705/7.38
See application file for complete search history.

(56) References Cited

U.S. PATENT DOCUMENTS

| | | | | |
|---|---|---|---|---|
| 2002/0116266 | A1* | 8/2002 | Marshall | 705/14 |
| 2002/0129139 | A1* | 9/2002 | Ramesh | 709/224 |
| 2003/0236691 | A1* | 12/2003 | Casatl et al. | 705/8 |
| 2005/0108043 | A1* | 5/2005 | Davidson | 705/1 |
| 2006/0020503 | A1* | 1/2006 | Harris et al. | 705/11 |
| 2006/0074714 | A1* | 4/2006 | Aziz et al. | 705/2 |
| 2007/0226546 | A1* | 9/2007 | Asthana et al. | 714/47 |
| 2008/0015903 | A1* | 1/2008 | Rodgers | 705/3 |
| 2010/0161356 | A1* | 6/2010 | Louie et al. | 705/3 |

OTHER PUBLICATIONS

Forrest W. Breyfogle III, Lean Tools That Improve Processes: An Overview, BPTrends, Mar. 2007, http://www.bptrends.com/publicationfiles/FOUR%2003-07ART-LeanToolsThat%20ImproveProcesses-Breyfogle-Final.pdf.*

* cited by examiner

*Primary Examiner* — Romain Jeanty
*Assistant Examiner* — Kurtis Gills
(74) *Attorney, Agent, or Firm* — T. Benjamin Schroeder; Ben Schroeder Law, PLLC

(57) ABSTRACT

A method of identifying losses in a transactional environment is described. The method includes collecting transactional information related to a business process that has an intended outcome. The transactional information includes transactions involving the use of a computing resource. These transactional information can be resolved into individual components. Losses are identified from the transactional information. Those losses are categorized into a plurality of loss categories. Thereafter, an efficiency metric defining performance of the business process is determined, where the business process is based on the at least one goal and the losses. The efficiency metric is included in a transactional command length map that describes efficiency of the business process.

22 Claims, 9 Drawing Sheets

400c

| TCL Steps | Description or Applicati | Command Length | VA/NVA | Mouse/Short cut | Command description |
|---|---|---|---|---|---|
| 1 | Email salesman to get customer name | | | | |
| 2 | Salesman responds by email with customer name | | | | |
| 3 | Go and return from engineering meeting | | | | |
| 4 | Windows Explorer | | | | |
| | | 1 | NVA | Mouse | Start |
| | | 1 | NVA | Mouse | Select settings |
| | | 1 | NVA | Mouse | Select control panel |
| | | 1 | NVA | Mouse | Select folder view |
| | | 1 | NVA | Mouse | Select C:/ |
| | | 1 | NVA | Mouse | Select Cst-Prints folder |
| | | 1 | NVA | Mouse | Select Cst-Prints .xls file |
| | | 1 | NVA | Mouse | Open |
| 5 | Microsoft Excel | | | | |
| | | 1 | NVA | Mouse | Change sheet |
| | | 1 | NVA | Mouse | Change sheet |
| | | 1 | NVA | Mouse | Resize window |
| | | 1 | NVA | Mouse | Scroll |
| | | 1 | NVA | Mouse | Scroll |
| | | 1 | VA | Mouse | Select # |
| | | 1 | NVA | Mouse | Copy # |
| 6 | Windows Explorer | | | | |
| | | 1 | NVA | Mouse | Change window |
| | | 1 | NVA | Mouse | Select C:/ |
| | | 1 | NVA | Mouse | Select Cst-Prints folder |
| | | 1 | NVA | Mouse | Select customer folder |
| | | 1 | NVA | Mouse | Select file |
| | | 1 | NVA | Mouse | Open file |
| | | 1 | VA | Mouse | Print file |

| Total | | |
|---|---|---|
| 22 | 2 | VA Total |
| | 20 | NVA Total |

FIG. 4C

| Factor % | Factor / Loss Category | Goal | Variable | Calculation | Unit | Comments |
|---|---|---|---|---|---|---|
| | | 480 | | | mins | Total time per shift |
| | | (45) | | | mins | Lunch, breaks |
| | ~510 | 435 ~A | | | | Total available time |
| 75% | Availability | | | | | |
| | 1) % Dedicated to task | | (80) | | mins | Non-scheduled time away from primary task |
| | 2) Interruptions (setup), distractions | | (15) | | mins | Non-scheduled interruptions |
| | 3) System performance | | (15) | | mins | System downtime |
| | 4) HID availability | | 0 | | mins | N/A |
| | | | (110) | | mins | Total availability losses |
| | | | | 325 | | |
| 35% | Performance ~520 | | | | | |
| | 5) Paging, scrolling, searching | 15% | (25) | (4) | mins | Goal is 85% reduction changing screens, windows, etc. |
| | 6) WPM typing | 65 | 4500 | | wpm | Goal is 65 WPM |
| | | 50 | 4500 | | wpm | Actual is 50 WPM |
| | | | (90) | (69) | mins | Should take (69) minutes, actually takes (90) minutes |
| | 7) Mouse versus shortcut | 25% | (35) | (9) | mins | (35) mins spent on commands w/ mouse. Goal is 75% reduction using short cuts |
| | 8) Training skill competency | 25% | (180) | (45) | mins | Time to perform a task requires (180) minutes. Reducing time by 75%. Excludes delays. |
| | 9) Voice input | | 0 | 0 | mins | No voice losses |
| | 10) System performance | | (35) | 0 | mins | (35) system performance losses |
| | 11) HID performance | | 0 | 0 | mins | |
| | | | (365) | (127) | | Summary of actual performance losses versus what goal of losses is projected to be |
| 75% | Yield ~530 | | | | | |
| | 12) Errors & rework loops | | 20 ~C | 25 ~B | 80% | Errors | Entitlement is (20) errors. Actual was 25 |
| | 13) Inspection rework & approvals | | 7 | 10 | 70% | Approvals | Entitlement is (7) approvals. Actual was 10 |
| | | | | | 75% | Example shows equally weighted average yield based on process goals. |
| | 14) Scrap | | | 0 | | |
| 19% | OPCE | | | | | |

FIG. 5

AUTOMATED METHODS AND APPARATUS FOR ANALYZING BUSINESS PROCESSES

CROSS REFERENCE TO RELATED APPLICATIONS

The present application claims priority to and the benefit of Provisional Application No. 60/912,755 to Guthrie, entitled "Automated Methods and Apparatus for Analyzing Business Processes," filed on Apr. 19, 2007, which is herein incorporated by reference in its entirety.

BACKGROUND OF THE INVENTION

1. Field of the Invention

The present invention relates generally to improvements to the performance of business processes. More particularly, the invention relates to systems and techniques for identifying the transactional losses within a business process in order to increase the efficiency of the business process.

2. The Relevant Technology

Historically, a broad set of metrics has been developed to help determine the efficiency of a manufacturing process. These metrics can help to improve a manufacturing process by identifying key areas towards which to focus in order to improve the efficiency of a process. In general, these metrics help identify wasteful manufacturing steps and eliminate them in order to create a continuous flow of operations to meet customer's expectations. For example, since the 1950s, the Japanese automobile industry has generally adopted and refined similarly defined metrics to improve their manufacturing efficiency.

More recently, attempts have been made with limited success to apply these broad set of metrics to include more general business processes. The service industry has been able to adopt these broad set of metrics to help improve their respective industries. For instance, the healthcare, banking, transportation, and other service industries have been able to apply these broad set of metrics to make their respective operations more efficient.

However, some of these business processes include the use of computers to accomplish various tasks within the processes. Difficulty in the application of the broad set of metrics to these business processes that include the use of computers have limited the usefulness of these set of metrics. In general, the operational use of the computers and their resulting products were not easily transformed into quantifiable measurements that fit within these broad set of metrics used to determine efficiency of a manufacturing process. As such, these historical broad set of metrics could not be applied to improving business processes that involved the use of computers.

As a result, new improvements to historical metrics are necessary to help identify wasteful steps in business processes that involve the use of computers.

SUMMARY OF THE INVENTION

A method of identifying losses in a transactional environment is described, in one embodiment. The method includes collecting transactional information related to a business process that has an intended outcome. The transactional information includes transactions involving the use of a computing resource. The transactional information can be resolved into individual components. Losses are identified from the transactional information. Those losses are categorized into a plurality of loss categories. Thereafter, an efficiency metric defining performance of the business process is determined, where the business process is based on the goal(s) and the losses. Further, the efficiency metric is included in a transactional command length map that describes efficiency of the business process.

According to another embodiment, the present invention includes systems and techniques for analyzing business processes. The business processes include various tasks involving the use of a computing resource. In one exemplary embodiment, data relating to business processes is captured, with each business process being resolved into individual components. Each component is associated with a process marker, suitably identifying the process with which it is associated. Operations are also associated with markers identifying their general type.

After information relating to operational components is captured, it may be analyzed in order to gain insight into the relative efficiencies involved in the various operations undertaken to carry out business processes. Analysis may be directed to gaining an understanding of the preponderance of value added versus non value added operations, and the use of resources involved in particular combinations of operations used in carrying out business processes. The use of resources may include measures such as command length, which comprises the number of individual steps taken in carrying out an activity, command time, which is the total time expended in execution of a command, delays caused by human interactions, use of more or less efficient techniques for carrying out a command, and other appropriate measures. Analysis may include generation of a suggestion or suggestions of alternative techniques for carrying out business processes, as well as presentation of various measures of efficiency for processes as actually conducted, versus measures of efficiency associated with best practices or improved practices. It is frequently possible to identify best practices for carrying out a business process. This can be accomplished, for example, by reviewing procedures commonly used in an industry, or through review and analysis of the various alternative techniques and selection of appropriate techniques. Once best practices have been identified, the results of the analysis of the business processes as they are actually carried out can be performed, and comparison can be made between best practices and actual practices.

Presentation of results may be accomplished, for example, through presentation of a graphical display showing resource consumption and value added status for various aspects of a business process, and comparisons between efficiency measures for current practices and improved practices. For example, details of a more efficient manner to enter data to a spreadsheet may be provided to a spreadsheet user, and these details may be presented in graphical format, showing aspects of operations used to carry out the data entry, together with alternative steps for carrying out the data entry, and relative measures of efficiency for the current and suggested alternative operations.

A more complete understanding of the present invention, as well as further features and advantages of the invention, will be apparent from the following Detailed Description and the accompanying drawings.

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

FIG. 4C is a chart listing the command steps of a transaction of the ECN business process introduced in FIG. 4A, in accordance with one embodiment of the present invention.

FIG. 5 is a diagram of a chart illustrating the calculation of losses in the three categories: availability, performance, and yield, in accordance with one embodiment of the present invention.

DETAILED DESCRIPTION OF THE PREFERRED EMBODIMENTS

Figure 1:
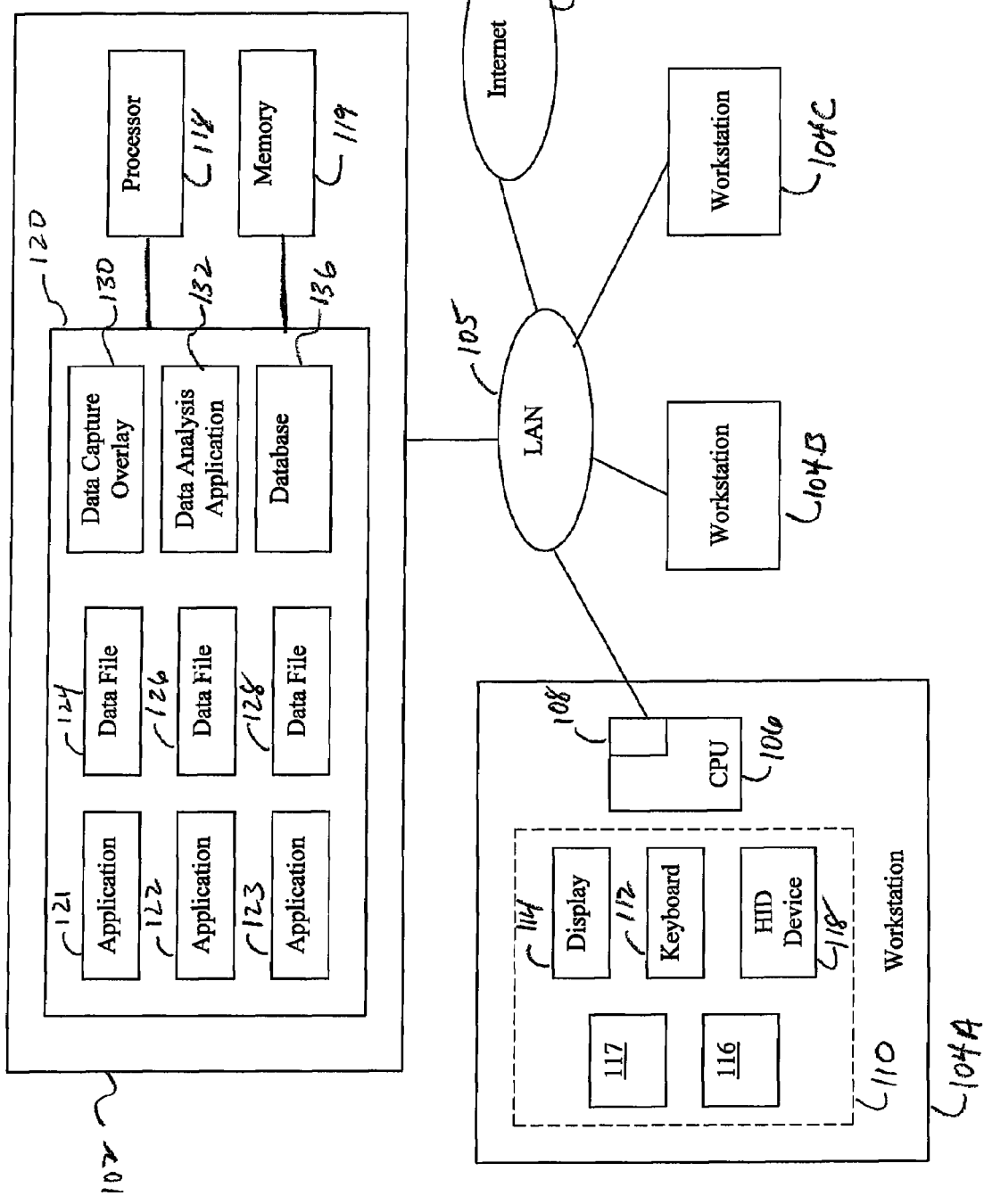
FIG. 1 is a diagram illustrating a system for conducting business processes including elements for collecting and analyzing data relating to those business processes, in accordance with one embodiment of the present invention.

Reference will now be made in detail to the preferred embodiments of the present invention, a method and system for analyzing business process, and more particularly for identifying transactional losses in a business process. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention as defined by the appended claims.

Accordingly, embodiments of the present invention are capable of identifying components of a business process, evaluating instances or tasks of the components with respect to their efficiency and value added status, and refining the tasks within components and their organization to increase the efficiency of performing the component by selecting the most advantageous tasks available to accomplish the component, including minimizing or reducing the use of tasks that do not add value to the overall business process.

Notation and Nomenclature

Embodiments of the present invention can be implemented on software running on a computer system. The computer system can be a personal computer, notebook computer, server computer, mainframe, networked computer, handheld computer, personal digital assistant, workstation, and the like. This software program is operable for providing targeted data delivery. In one embodiment, the computer system includes a processor coupled to a bus and memory storage coupled to the bus. The memory storage can be volatile or non-volatile and can include removable storage media. The computer can also include a display, provision for data input and output, etc.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "collecting," "determining," "identifying," "categorizing," or the like refer to the actions and processes of a computer system, or similar electronic computing device, including an embedded system, that manipulates and transfers data represented as physical (electronic) quantities within the computer system's registers and memories into other data similarly represented as physical quantities within the computer system memories or registers or other such information storage, transmission or display devices.

Introduction to the Use of Metrics for Improvement of Business Processes

Business processes can be thought of as including a number of components, including functions involving data management and organization, actions involving relations between individuals, numerical analysis, graphical presentation, and numerous other components. Many opportunities exist for improving the efficiency of the conduct of business processes, including analyzing operations and eliminating or consolidating those that add little or no value, such as those presented in embodiments of the present invention. In particular, embodiments of the present invention are well suited to improving those business processes that are repeatable to achieve similar intended outcomes. For example, embodiments of the present invention are suited to improving those business processes that can be continually improved through repeated execution.

Many business processes include the use of computer applications and interactions between human operators and computer applications. The use of computer applications tends to allow for convenient capture of information relating to the operations performed, as a computer can be directed to automatically capture information relating to its activities and the inputs received from human operators (e.g., through various human interface devices). For instance, computer applications frequently include large numbers of interactions with human operators in which human operators provide inputs, such as data or commands to the applications, and data relating to these interactions, as well as internal computer operations, can be stored for analysis. In addition, embodiments of the present invention are capable of establishing protocols for the entry of information relating to operations and operational components that do not involve computers or interactions with computers, in order to make this information available for analysis.

Processes may advantageously be analyzed in terms of the value they add, and the operations or activities making up a process can also be analyzed in this way, in accordance with one embodiment of the present invention. Activities or operations that add no value may be referred to as non value added activities, or waste. For instance, an activity is said to be value added if it transforms the good or service, if the customer is willing to pay for the result of the activity, and if the activity is being performed for the first time. In addition to evaluating activities based on whether or not they add value, it is also possible to evaluate activities based on the resources they consume. For example, many processes involve the use of computer applications, such as word processing and spreadsheet operations, and carrying out such processes involves the execution of a number of operations using these applications.

Executable operations in an application may include, for example, selecting and copying text, retrieving files, entering information into cells in a spreadsheet, entering a formula into a spreadsheet, attaching a file to an email, and various other operations. Further, operations may be resolved into a number of operational steps, and each step involves the use of resources that can be further translated into a usage of time. In many cases, processes can be carried out in a number of alternative ways, with each alternative resulting in a different consumption of resources.

Analysis of the various operations undertaken in performing business processes can yield advantageous results in terms of decreasing the proportion of resources devoted to non value added activities, and achieving an overall improvement in efficiency by selecting approaches to carrying out processes that represent the most efficient use of resources, as will be described below in relation to FIGS. 1-6.

Systems and Methods for Determining Transactional Losses for Purposes of Improving Business Processes FIG. 1 illustrates a system 100 for carrying out activities related to improving business processes, in accordance with one embodiment of the present invention. The system 100 facilitates the efficient performance of business processes, such as communication, transfers of information, conveying of instructions between persons or groups, computer commands, retrieval and processing of computer generated and computer stored information, and numerous other activities.

Computer and other data processing facilities within system 100 are typically used to carry out numerous processes, allowing for automatic capture of data related to such processes. In addition, for activities that do not involve the user of automated facilities to carry them out, information related to those activities can be collected, stored, and analyzed, as will be further described below.

Considerable insight can be gained into the efficiency by which business processes are carried out by examining the inputs and activities used in carrying out the business processes, and in identifying the specific input method used in entering each input. In one embodiment, the efficiency of carrying out operations frequently relates closely to the number of steps involved in providing inputs, and the efficiency of the method used to provide inputs.

For example, it is frequently useful to capture all voice, keyboard, and mouse inputs used in carrying out activities using automated facilities, and to identify each input as being a voice, keyboard, or mouse input. As is discussed in greater detail below, a system such as the system 100 may be used to gather and analyze such inputs. In addition, non-automated activities, such as personal interactions, and communication for which information is not automatically gathered, such as some telephone calls and other communications, examinations of paper files, and other such activities, can be entered in order to make the data available for analysis.

As is discussed in greater detail below, a system such as the system 100 gathers information relating to the steps, tasks, transactions, or activities undertaken in carrying out various business processes, and evaluates the efficiency, burden on resources, and value added status of the various tasks, and in general the business process. For purposes of the present Application, steps, tasks, transactions and activities are intended to refer to actions necessary to perform a business process, but will be referred to as transactions. Such evaluation may include identifying best practices for carrying out business processes and comparing best practices to actual operations within an organization, or within individual users and groups within the organization.

The system 100 includes a server 102 and a number of user workstations 104A-104C, communicating with the server 102 through a local area network (LAN) 105. System 100 in FIG. 1 is representative of any number of configurations for facilitating the transfer of information for purposes of analysis to improve business processes. For instance, the LAN 105 may be replaced by any network for communicating information between the workstations 104A-C and the server 102. As an example, the workstations 104A-C may be directly coupled to server 102, or the workstations 104A-C may be communicatively coupled to server 102 through internet 134.

System 100 includes computing resources, or workstations, 104A-C. For purposes of brevity and clarity, the workstation 104A is representative of each of the workstations 104A-C. As shown in FIG. 1, workstation 104A includes a central processing unit (CPU) 106 that is coupled to server 102 by a network interface 108. In addition, workstation 104A includes a user interface 110 for providing access to the workstation 104A. As a representative example, workstation 104A includes a keyboard 112, a display 114, and a mouse 116. In addition, workstation 104A may include a telephone 117, or any other audio communication device. Further, workstation 104A includes a human interface device (HID) 118. For example, HID 118 can include bar code scanners, voice operated devices, and any other type of device that provides an input to workstation 104A.

System 100 also includes a server 102 for processing the information using various applications for purposes of improving business processes. The server 102 suitably includes a processor or CPU 118, short term memory 119, and long term storage such as a hard disk 120. The workstation 104A suitably furnishes access to data and executable applications stored on the server 102, for example, on the hard disk 120. The stored data and applications may include applications such as the applications 121, 122, and 123, and data files 124, 126, and 128.

In addition or as an alternative, the workstation 104A itself may use locally stored applications and data for purposes of improving business processes. For instance, the functionality presented in server 102 through various applications (e.g., data capture overlay application 130) is also attributed to workstation 104A through the various applications. That is, those applications are stored on workstation 104A for purposes of improving business processes. As such, workstation 104A is capable of processing information collected from workstation 104A, for purposes of improving the performance of transactions involving the use of workstation 104A, wherein the transactions are associated with a business process. In addition, workstation 104A is capable of processing information collected from other workstations for purposes of improving transactions involving the use of those workstations.

More specifically, server 102 may suitably host a data capture overlay 130 application. The data capture overlay 130 operates as an intermediary between the workstations 104A-104C and the elements hosted on the server 102 with which the workstations 104A-104C communicate. For instance, the data capture overlay 130 passes user inputs to appropriate applications, and passes responses and data to the destination, whether this destination is the workstation from which the user inputs originated, another workstation, a remote destination such as the internet 134, or some other destination. If desired, the data capture overlay 130 may be chosen to be active or inactive at any particular time. For example, when data is being gathered so that business processes can be analyzed, the data capture overlay 130 may be set to be active, but may be inactive during routine operation, in order to avoid slowdowns caused by the operation of the data capture overlay 130.

As a representative example, data capture overlay 130 captures all inputs to a corresponding computing resource, such as workstation 104A. In one embodiment, data capture overlay 130 is stored on workstation 104A in application form and executed to collect inputs to workstation 104A. The captured information is associated with executable commands for various applications stored and executed on workstation 104A. For instance, captured information may originate from any type of input device, such as a keyboard, mouse, a device recognizing voice for purposes of entering commands, or any other input device. In one case, the captured information originates from HIDs, such as bar code scanners, etc., as previously described.

In addition, the data capture overlay 130 may also receive data through direct or user input for purposes of collecting non-automated transactions used for performing business processes. For example, it may be desired to analyze conversations, meetings, telephone calls, retrieval of physical objects such as paper files, and other activities that do not involve the use of automated equipment.

The data capture overlay 130 stores captured data in a database 136. Captured data may include information related to automated transactions involving a computing resources, such as workstations 104A, or information related to non-automated transactions as described above.

As shown in FIG. 1, the data analysis application 132 examines the collected data in the database 136, in order to evaluate the business processes and transactions represented by the collected data. As such, the data capture overlay 130 suitably collects data related to activities undertaken in carrying out business processes, and the data analysis application 132 suitably identifies each business process for which collected data is being analyzed. This identification may be achieved through analysis of data, for example, tracing the path of data from origin to destination, and using characteristics of the data to associate the data with a business process. Alternatively, a business process with which the data is associated may be identified at the time the data is captured or at the time of analysis. Both forms of analysis may be used to provide valuable insight into the activities being undertaken to carry out the business process, and in a typical presentation of analysis results, a user is able to view results of either or both forms of analysis.

Figure 2:
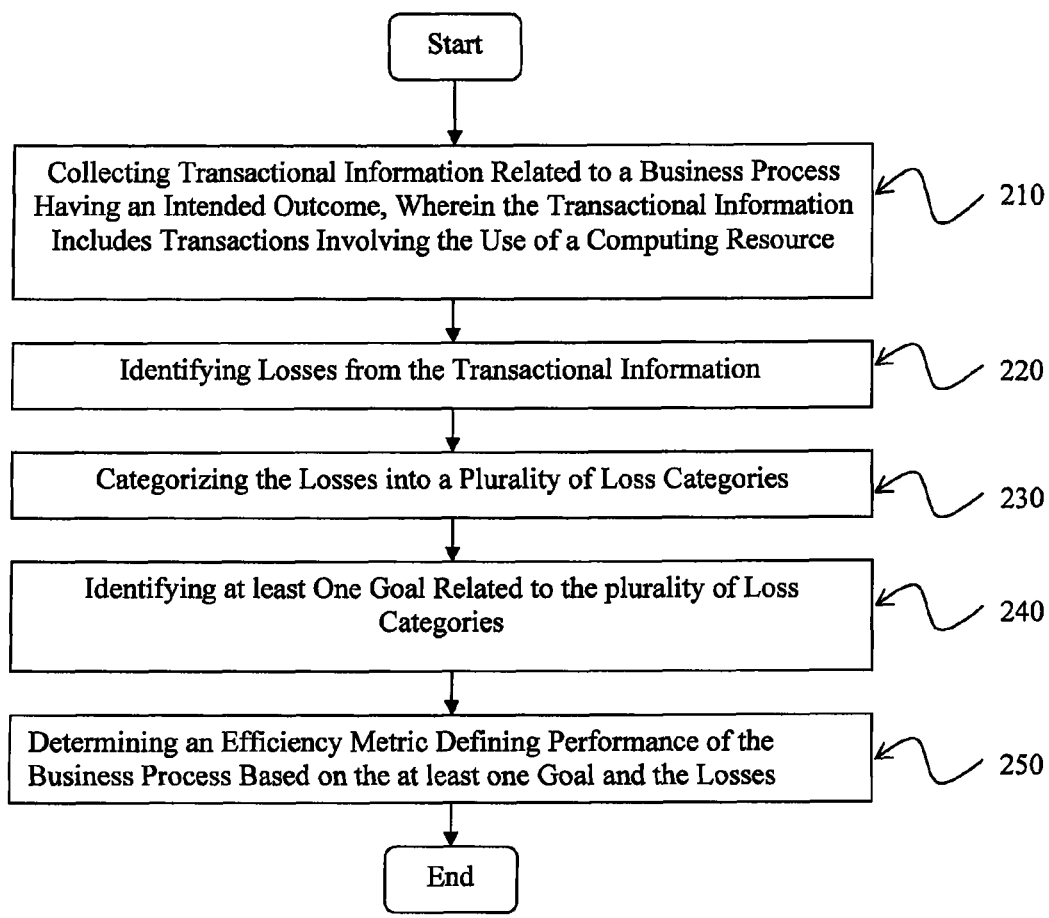
FIG. 2 is a flow diagram illustrating a method for identifying transactional losses for use in improving business processes that involve the use of computing resources, in accordance with one embodiment of the present invention.

FIG. 2 is a flow diagram 200 illustrating a method for identifying transactional losses for use in improving business processes that involve the use of computing resources, in accordance with one embodiment of the present invention. More specifically, flow diagram is used to improve business processes that have intended outcomes that are repeatable. As a result, continued improvement of the performance of the business process allows for improved efficiency in performing the business process. For instance, system 100 of FIG. 1 is used to implement flow diagram 200, in one embodiment.

Figure 4A:
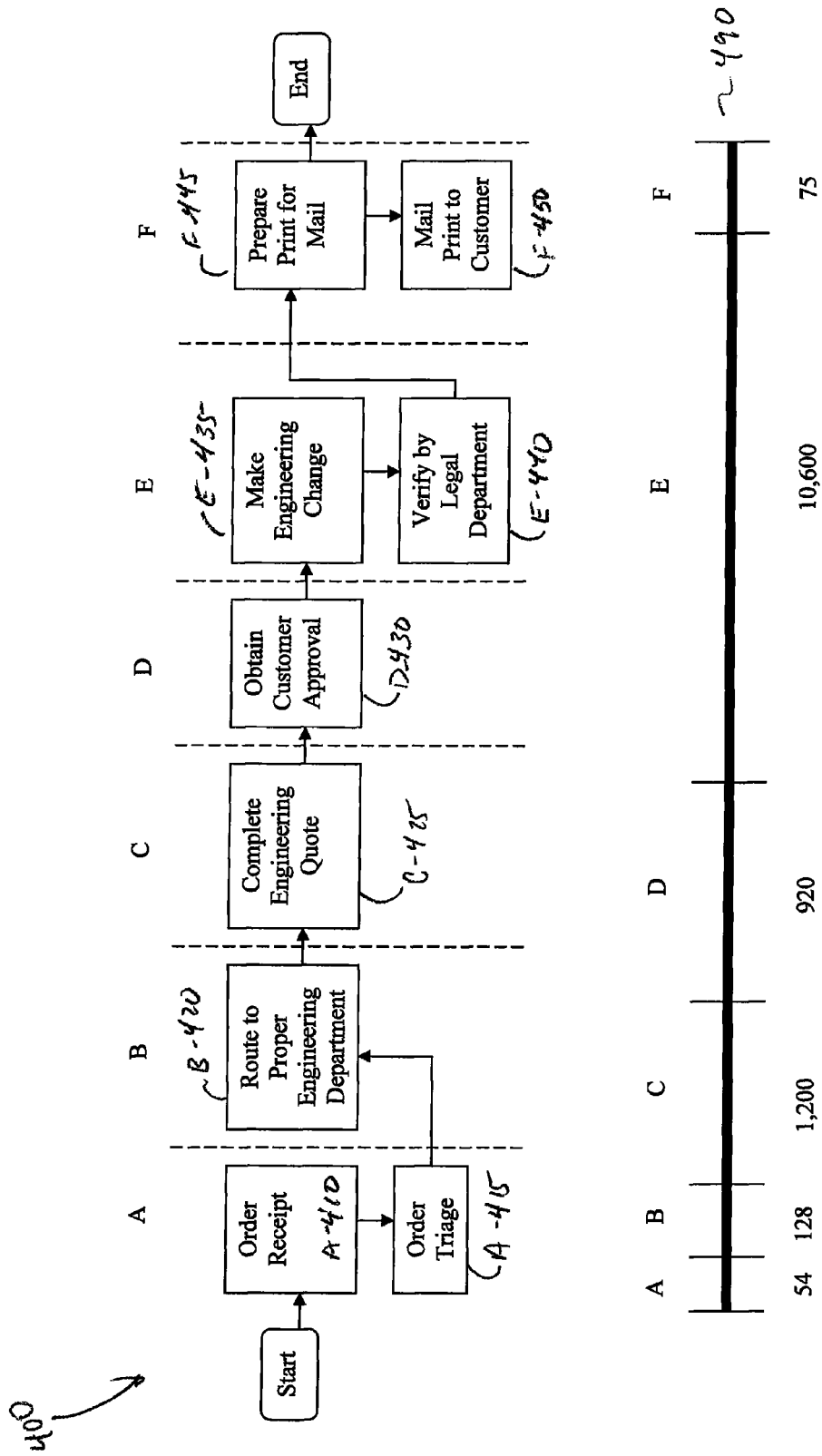
FIG. 4A is a process flow illustrating various components and individual processes in an overall business process, in accordance with one embodiment of the present invention.

Flow diagram 200 is used to identify transactional losses in a business processes, such as the business process 400 shown in FIG. 4A. Business process 400 represents an engineering change notice (ECN) process for generating a request and receiving authorization for a change in a design, for example. The overall business process 400 may include numerous components that are further broken down into stages. In addition, process 400 may involve the use of multiple individuals, some or all of which at some point interact with an application on a computing resource. While business process 400 is an ECN process, embodiments of the present invention are well suited to implementing flow diagram 200 on any type of business process, and especially those business processes that involve the use of one or more computing resources.

For example, as shown in FIG. 4A, the ECN business process 400 is broken up into six different stages A-F. Each stage may include one or more components. For instance, stage A includes the receipt of an order at component A-410 and performance of order triage at A-415, for purposes of prioritizing orders. In stage B, business process 400 includes a routing to the proper engineering department of the order at component B-420. At stage C, business process 400 includes the completion of the engineering quote at component C-425 for changing the design as requested in the order at A-410. In stage D, business process 400 includes obtaining the customer's approval to go ahead with the change in the design, as outlined in component D-430. At stage E, the business process is represented by two components. In component E-435, the engineering design change is made. In addition, verification of the engineering change is performed by the legal department at component E-440. At stage F, a print of the new design, for example, is prepared and printed at F-445, and at F-450 the print is mailed to the customer.

Embodiments of the present invention are capable of identifying transactional losses throughout business process 400 or for the entire business process. Even more specifically, the method outlined in flow diagram 200 is used to identify transactional losses throughout a particular component in business process 400, in one embodiment. In addition, the identification of the losses are associated with a particular user that performs transactions related to the particular component. For instance, an efficiency rating is determined for that user in performing the transaction related to that particular component. Efficiency ratings for all the transactions and components related to a specific business process is presented in a transactional command length (TCL) map so that areas of improvement can be identified for purposes of improving the overall performance of the business process, as will be further described in relation to FIG. 6.

Returning now to FIG. 2, flow diagram 200 is implemented to identify transactional losses for a particular node or component of a business process, wherein the transactions of the component are associated with a particular individual, a group of individuals, performing a particular function, or may be associated with a particular meeting, in accordance with one embodiment of the present invention. For instance, flow diagram 200 is used to identify transactional losses and improve the performance of transactions in a particular component, such as complete engineering quote C-425.

Figure 4B:
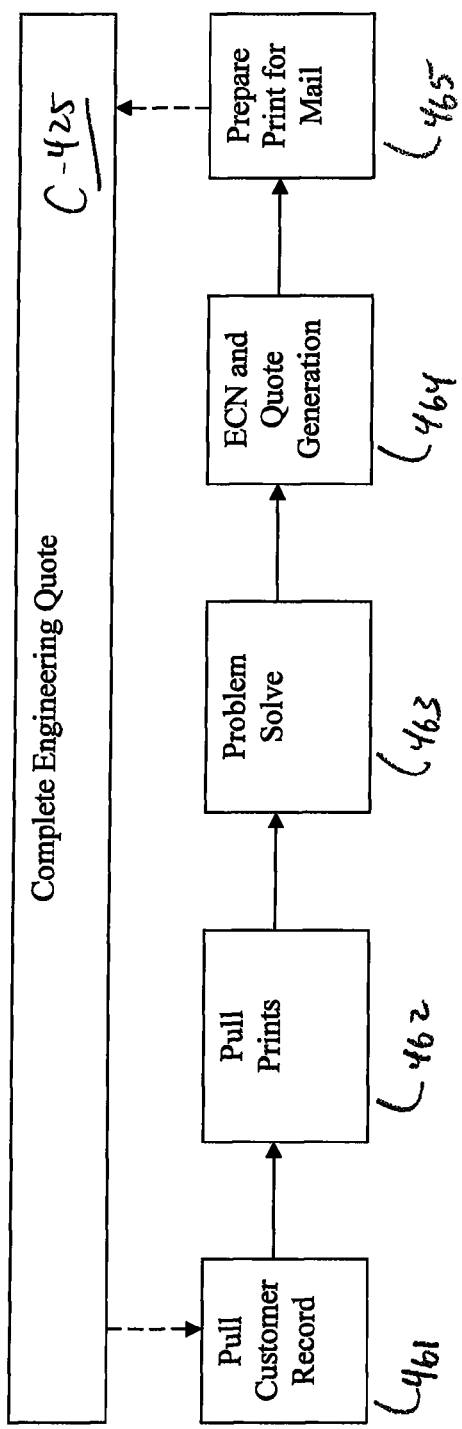
FIG. 4B is a process flow illustrating the various tasks in a component of an overall business process first introduced in FIG. 4A, in accordance with one embodiment of the present invention.

At 210, transactional information is collected. For instance, as ongoing transactions of a business process are conducted, data related to steps and information exchanges performed in conducting the business process is captured. That is, the transactional information is related to a business process having an intended result, for example performing an ECN of business process 400. More specifically, the transactional information may be collected for a particular component, such as complete engineering quote C-425. As such, as shown in FIG. 4B, transactional information that is collected includes automated transactions (e.g., those involving the use of a computing resource) and non-automated transactions relating to operations for which information is not automatically collected, such as interactions between individuals when performing a transaction. These transactions are performed to achieve the intended result in a component, such as the component C-425 for completing an engineering quote. As shown in FIG. 4B, the transactions include transaction 461 to pull customer record, transaction 462 for pulling prints, transaction 463 for problem solving, transaction 464 for ECN and quote generation, and transaction 465 for preparing print for mail 465.

For instance, the collection of information includes the collection of key stroke activity related to one or more computing resources involved in performing transactions. Moreover, executable commands for applications are collected, such as copy, paste, return, etc. Further, any input related to executable commands performed by the one or more computing resources are collected.

In addition, additional information may be obtained from the interactions with the computing resource that may indicate more than just the performance of a particular execution, such as a resource loss in re-doing a particular transaction of a business process, or loss due to inappropriate interfaces. This information relates to the quality of performing the transaction. For instance, rework to correct an error, or performing corrective action as a result of failure to pass an inspection reduces the quality of performing the transaction and the overall business process. This additional information may be obtained by collecting live video of screen activity related to the one or more computing resources involved in performing transactions of a business process. For instance, numerous business process operations involve navigation in and between computer displays, and the design of a display can have a significant effect on the efficiency with which operations are carried out. As such, redesign of displays can significantly improve efficiency. For instance, displays often comprise multiple windows. The selection, positioning, and sizing of windows in a display can affect efficiency. To this end, the collection of information suitably captures and stores information relating to windows and other display elements. Thereafter, an analysis is performed to determine the relationship between command efficiency and display design for purposes of discovering appropriate modifications in screen design. In addition, the collection of information may capture information relating to modifications of the display by a user, and the data analysis application 132 may use this data to identify a preferred display or preferred display sequence for the user.

As information is gathered for the entire business process (e.g., business process 400) process markers may be associated with the gathered information, or transactions. For instance, the process marker is capable of identifying the type or nature of the interaction, or to identify which component or transaction is being performed within the business process. As another example, a business process of processing a customer order may consist of the following broad steps, or components: a) receiving an incoming telephone call; b) recording a customer identification; c) recording order information; d) checking item availability; e) recording credit card or other payment information; f) scheduling the order for shipment; g) confirming the order; and h) transmitting a confirmation, such as a confirmation email, to the customer.

Each of steps a) through h) may include a number of individual smaller steps or transactions, which are identified as executable commands on a computing resource. For example, the first component a), described as receiving a call, may involve the transactional steps of copy, paste, select, and scrolling as executable commands. In addition, the second component b), described as recording of customer identification may involve the transactional steps of open, file, paste, and type input.

As such, in one embodiment, each of component steps (a) through (h) may be used to mark the commands and transactions with which it is associated. That is, the process steps (a) through (h) may themselves be marked to indicate the general component category into which they fall.

At 220, losses from the transactional information are identified. More specifically, a plurality of transactions are identified that were performed in the component of an overall business process, or for the entire business process overall, depending on the focus of analysis. Thereafter, necessary transactions are identified. These transactions are necessary to achieve the intended outcome of the business process, or the component of the business process. In addition, unnecessary transactions are also identified, and can be determined by considering the availability of alternative commands, as well as a number of other considerations conducive for analysis, such as command length, described more fully below. As such, the identification of the these types of transactions help identify process steps as being value added or non-value added.

Given this characterization as being value or non-value added types of transactions, the various transactions can be analyzed to determine the relative efficiency or inefficiency of that component, or of the overall business process, depending on the focus of analysis. In one embodiment, a command length is determined for a particular component, or for an overall business process, as will be further described in relation to FIG. 3. Specifically, command length defines the number of overall transactions that are executable commands on a computing resource that are performed in a component, in one particular embodiment. Command length can also define the number of transactions performed overall for a business process. For instance, in FIG. 4A, line chart 490 illustrates the command length of each of the stages performed in business process 400. For instance, a command length of 54 is associated with stage A, while a command length of 10,600 is associated with stage E.

Additionally, a command length is translated into a time basis, in one embodiment. That is, the command length is translated into a time period, known as a command time. This command time can be used to determine the efficiency of a transaction, or component of a business process.

At 230, the losses are categorized according to a plurality of loss categories. Each loss category helps to define a type of loss that is involved in a business process. These loss categories can be further compartmentalized into three groups of loss categories: availability, performance, and yield, as will be further described below in relation to FIG. 5. For instance, availability relates to the actual time dedicated to a primary business process, and the time that is lost from the available time performing other duties. Performance defines various losses that relate to the speed of performing transactions in a business process. Yield defines the losses relating to performing task multiple times. As a result, these losses are used to determine an efficiency metric that defines the performance of the business process.

At 240, goals that are related to the plurality of loss categories are identified, as will be further described in relation to FIG. 5. In one embodiment, the goal is user defined. For instance, the goal is associated with a best practice of an industry that may be determined through analysis or experimentation. As such, a comparison of business processes against the best practice is used to determine goals, and is used to help determine the efficiency of the business process.

At 250, an efficiency metric is determined. The efficiency metric defines the performance of the business process and is based on the goals and the transactional losses previously identified, as will be further described in relation to FIG. 5. For instance, the efficiency of a business process may be determined by comparing transactions and the order and number of transactions as they are conducted against the best practices. For instance, data related to command length, command time, delay, the prevalence of inputs using keyboard versus mouse, and similar information may be analyzed to determine efficiency of a business process. Specifically, in relation to commands, a command and its related transactions may be evaluated against other commands and transactions used for achieving the same intended result. Evaluation may include determining if transactions can be eliminated, or to reduce the number of transactions in a command, or to use more efficient or less burdensome techniques to perform the transactions in a command.

In one embodiment, the efficiency metric is based on the various metrics previously defined: availability, performance, and yield, as will be further described in relation to FIG. 5, below. Specifically, the efficiency metric is calculated by multiplying the percentages of the above three metrics to obtain an overall PC effectiveness (OPCE) metric for business operations that involve a computing resource. As a result, the efficiency metric can be used to improve those business operations.

FIG. 5 is a diagram of a chart illustrating the calculation of losses in the three categories previously described above: availability, performance, and yield, in accordance with one embodiment of the present invention. As shown, each of the three categories of losses are expressed in percentages. An overall OPCE metric defining an overall efficiency metric is also defined by multiplying each of the metrics expressed in percentages.

As shown in FIG. 5, availability 510 pertains to the percentage of time devoted to performing transactions of the business process. For instance, as shown in FIG. 5, at point A, it is determined that a total available time for a particular individual is equal to 435 minutes. This is calculated from a total time dedicated to a particular shift, and subtracting from the total time other time the individual is not qualified to work, due to breaks or lunch. Ideally, this total available time would be used by the individual for performing the business process. However, various losses are defined that reduce the efficiency of performing the business process, as described below.

Four losses are listed that take time away from performing the business process: (1) time devoted to performing the business process; (2) time lost for interruptions; (3) system and network downtime; and (4) unavailability of human interface devices (HIDs). Specifically, the first loss pertains to what percentage of the total available time is assigned to the individual for performing the business process. The second loss pertains to interruptions and distractions where the individual was pulled away from performing the business transaction. The third loss pertains to a major system malfunction, for example a server downtime. The fourth loss pertains to the loss of time waiting for an HID to function properly. Each of these losses are directly expressed in time.

As shown in FIG. 5, the total available losses of availability is calculated as 110 minutes lost. The availability metric is based on a goal of total available time devoted to performance of the business process and the time lost from the total available time. As a result, the availability of the individual can be calculated and is 75 percent. As such, the individual is actually available over the entire shift 75 percent of the time to perform the business process.

In addition, other losses are categorized according to performance 520. The performance losses relate to activities that are performed in order to complete the transactions associated with completing the business process. In a sense, performance is a measurement of speed and how well the individual can perform under these various performance activities. As such, the performance of these activities is expressed on a time basis, in one embodiment. Once a specific performance activity is measured, a user defined goal is determined. Thereafter, a performance metric can be determined by comparing the ideal (e.g., goal) time against the actual time that includes performance losses. Specifically, the performance metric is determined by dividing the ideal time by the actual time.

For instance, seven performance losses 520 are listed, as follows: (5) paging, scrolling, and searching; (6) words per minute (WPM) typing; (7) mouse versus shortcut; (8) training skill competency as it related to command length and time; (9) voice input; (10) system performance; and (11) HID performance. These losses are quantified in a time basis, in one embodiment.

Specifically, loss (5) defines the amount of time spent for application searching activities, such as paging and scrolling, etc. For instance, 25 minutes were observed navigating through one or more applications associated with a computing resource. A goal of an 85% reduction in navigation time is determined. This reduction can be translated into a corresponding time of 4 minutes, as a calculated goal. Similarly, loss (6) defines the proficiency of the individual for typing, as expressed in time. A goal was also set for typing proficiency. Loss (7) indicates the amount of time spent executing operations using a mouse, and a corresponding goal for time that can be reduced using shortcuts, for example. Loss (8) pertains to individual training skill competency, and is related to command length, or the number of executable operations needed to perform a transactions, as will be described in more detail in relation to FIG. 3. Loss (9) pertains to inability to use applications due to a lack of proficiency in using the voice commands, or voice activated applications. Loss (10) relates to system performance, and measures down time, but not as severe as the system performance in loss (3). Loss (11) relates to HID usage and defines the amount of time lost due to the inability of the individual to properly use an HID.

As shown in FIG. 5, the total performance metric is calculated as 35 percent. In particular, the total actual amount of time spent for the various performance activities is calculated. Then, the total amount of time allocated to spend performing those activities is calculated. Thereafter, the performance metric is calculated by dividing the ideal amount of time allocated to spend performing the activities by the actual amount of time spent performing those activities. As shown in FIG. 5, the performance metric is calculated to 35 percent by dividing 127 minutes by 365 minutes.

In addition, still other losses are categorized according to yield 530. The yield losses relate in general to non-value activities, such as those performed for correcting errors or poor workmanship. A yield metric is calculated based on an achievable goal and the total number of performed activities that includes yield losses.

For instance, three losses are categorized under yield 530. Loss (12) defines the number of rework loops that were performed to correct identifiable errors. For instance, if information is typed in incorrectly and identified later, the action to correct the error is counted as a rework loop. A goal is also set for performing rework loops at point C. That is, twenty rework loops to correct errors are allowed and set as a goal. In addition, the actual number of rework loops performed in one shift is listed at point B, and is shown as being twenty-five. The yield metric for loss (12) is calculated as ideal divided by actual, and comes out to 80 percent.

Loss (13) defines the number of times spent performing or seeking an approval. For instance, in the business process, approval or inspection points are performed. Ideally, no inspections should be performed more than once. A failed inspection requires another approval. As such, a goal of 7 approvals is defined. For instance, there are 7 inspection points required in performing a business process. A goal is defined requiring that all inspection pass the first time. In addition, the actual number of inspections and approvals listed ten, and as such, indicates that three inspections were performed more than once. The yield metric for loss 13) is calculated as ideal divided by actual, and comes out to 70 percent.

Loss (14) is a scrap loss, and defines other types of activities that are performed throughout a shift, but results in losses if they exceed an acceptable threshold. For instance, a scrap loss could describe documents or information that was created, and yet discarded without being used in the business process.

An overall yield calculation is determined for the yield 530 losses. In particular, each of the yield metrics calculated for the particular losses (e.g., losses 12-14) are weighted and averaged to calculate the overall yield calculation. In the particular example shown in FIG. 5, all the yield metrics are weighted equally. As such, the average of 80% and 70% presents a 75% overall yield metric. In this calculation, scrap losses were not considered.

As a result, an overall OPCE or efficiency metric can be calculated. For instance, the metrics for availability 510, performance 520, and yield 530 are multiplied together to generate an overall OPCE efficiency metric of 19 percent. Specifically, the OPCE is calculated as follows:

$$OPCE(\%) = Availability(\%) * Performance(\%) * Yield(\%)$$
$$= 75\% * 35\% * 75\%$$
$$= 19\%$$

As such, there is much room for improvement. That is, since the overall OPCE metric is a measurement of efficiency, ideally, the higher the value of the OPCE efficiency metric, the better.

In another embodiment, the overall OPCE efficiency metrics of a plurality of individuals of a particular company is used to identify areas of improvement for the company. More specifically, since the OPCE range is unitless, the range of values of the OPCE efficiency metric can be used to identify how well a company is performing a particular business process.

In particular, Table 1 illustrates OPCE efficiency metrics for two companies: Company 1 and Company 2. Individuals, listed as users in Table 1, for both Company 1 and Company 2 perform the same function. That is, the User 1-3 for Company 1 and Users 1-3 for Company 2 all perform the same business process, which may include transactions involving a computing resource. For example, the users may all perform basically the same business process in answering service calls in a call center. Specifically, Table 1 is illustrated below and presents OPCE efficiency metrics for the users of Company 1 and Company 2.

TABLE 1

| Company 1 | | | Company 2 | | |
|---|---|---|---|---|---|
| User | OPCE (%) | Note | User | OPCE (%) | Note |
| User 1 | 10 | Low | User 1 | 30 | Low |
| User 2 | 30 | | User 2 | 40 | |
| User 3 | 50 | High | User 3 | 50 | High |

As shown in Table 1, Company 1 includes Users 1-3. On the low end, User 1 has an OPCE efficiency metric of 10 percent. On the high end, User 3 has an OPCE efficiency metric of 50 percent. As a result, a range of OPCE efficiency metrics for Company 1 is 40, which can be expressed as an OPCE range of 40.

The OPCE range associated with Company 1 can be compared to the OPCE range of another company for purposes of gauging the performance of Users 1-3 of Company 1. Specifically, the OPCE range for Company 1 is compared to the OPCE range of another company, such as Company 2. The performance of users of Company 2 may provide a baseline for performance, such that Company 2 is considered to be the best practice for companies performing a similar business process, in one case. In another case, Company 1 and Company 2 may be merging, and a comparison of the OPCE values for each company may be performed to determine areas of improvement in performing the business process for either of the companies.

As shown in Table 1, Company 2 includes Users 1-3, which perform basically the same function, or business process, as the user 1-3 for Company 1. On the low end, User 1 has an OPCE efficiency metric of 30 percent. On the high end, User 3 has an OPCE efficiency metric of 50 percent. As a result, a range of OPCE efficiency metrics for Company 2 is 20, which can be expressed as an OPCE range of 20.

A comparison is made between the OPCE ranges for both Company 1 and Company 2. As evident, Company 1 has more variation in the OCPE range than Company 2. That is, the OPCE range for Company 1 is 40, while the OPCE range for Company 2 is 20. As such, Company 1 has more waste (e.g., non-value added activities) when performing the business process than Company 2, in one embodiment. Correspondingly, the overall efficiency of Company 1 could be inferred to be less than the overall efficiency of Company 2, in one embodiment.

In addition, once it has been identified that Company 1 has a greater range of OCPE efficiency metrics, focus can be turned to the OPCE efficiency metrics for Company 1 to determine which areas need improvement. For example, one of the availability, performance, or yield metrics, or a combination of the metrics may contribute more to the OCPE range. As such, reducing that value will correspondingly reduce the OPCE range.

Figure 3:
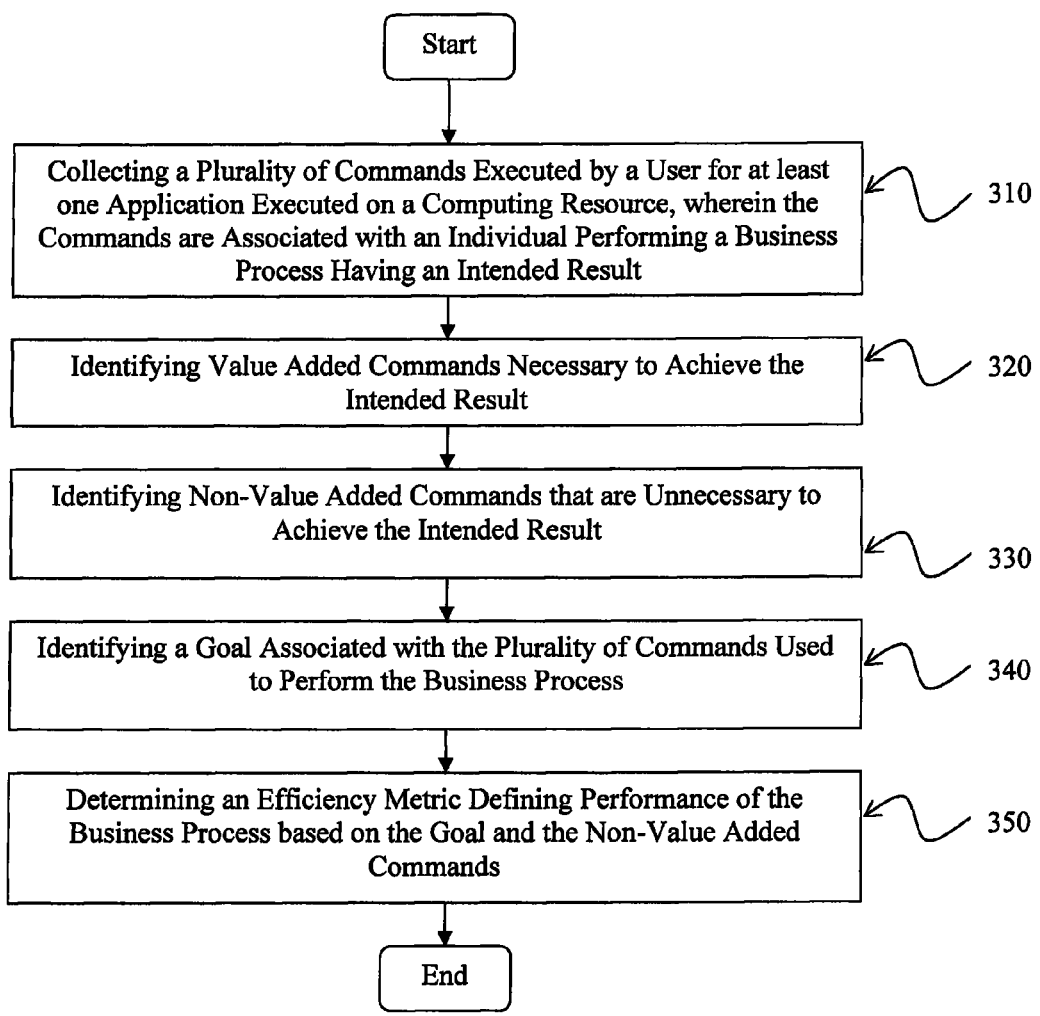
FIG. 3 is a flow diagram illustrating a method for identifying transactional losses performed in accomplishing a task in a business process for use in improving the performance of that task, in accordance with one embodiment of the present invention.

FIG. 3 is a flow diagram 300 illustrating a method for identifying transactional losses for purposes of improving a business process, in accordance with one embodiment of the present invention. Specifically, flow diagram 300 is used to determine a performance metric for loss (8), training skill competency. That is, flow diagram 300 helps to determine how well an individual has been trained in terms of execution of commands for a particular application, or set of applications, related to a component, or transaction, of a business process.

Command length provides an important measure of the expenditure of resources in carrying out a business process, because each individual step or transaction involves expenditure of resources in 1) transitioning to the step from the previous transaction, 2) performing the transaction, and 3) transitioning to the next transaction. Reduction of command length, that is, reduction in the number of transactions or executable commands, can provide significant gains in efficiency, and the analysis provided by the systems and techniques in embodiments of the present invention can provide considerable insight in reducing command length with a consequent reduction in expenditure of resources and gains in efficiency.

At 310, a plurality of commands is collected. Each of the plurality of commands is executed by an individual for at least one application executed on one or more computing resources. The individual is executing the commands for purposes of performing a transaction or component of a business process having an intended result.

Additional characteristics of a command can be considered in evaluating the command length for purposes of evaluating the efficiency of, or the burden on, resources. These additional characteristics are presented by the implementation of a command or command sequence. For instance, at 320, value added commands are identified, and are necessary to achieve the intended result. Also, at 330, non-value added commands are identified.

For example, commands are frequently implemented using keyboard, mouse, or voice inputs, and other HID inputs, and often involve data furnished through the use of these inputs. The specific input method used for a command, or for command steps, provides important insight into the burden imposed by a command step. Typically, mouse inputs are the least efficient, and understanding the input method for each command step can provide opportunities to substitute more efficient input methods for less efficient input methods. Additional mouse related inputs may be non-value added, while the substituted shortcut methods may be defined as being value added transactions.

As an example, one measurement of command length includes capturing data from input sources associated with a computing resource, as used in an interaction between an individual and a workstation, such as "pull prints" which is noted in 462 of FIG. 4B. The commands involved with pulling prints, which is a series of transactions, or steps, is partially listed, as follows: 1) change sheet; 2) change sheet; 3) resize window; 4) scroll; 5) scroll; 6) select #; and 7) copy #. In the present example, the command length for that particular component is seven steps.

Another criteria is the length of time, based on a number of statistical measures, required to complete a command. This length of time is defined as command time, as previously introduced. The commands an their associated command times in the command length can be analyzed to determine a more efficient process for achieving the intended result. For example, other commands which will fulfill the same intended result or function are analyzed to determine if they have a shorter command length than the command in question. In addition, it is also determined if commands are not being used that should be, based on a measure of their efficiency compared to that of other commands that are being used.

Alternative combinations of commands that may be used to accomplish the same result maybe suggested, along with a comparison between the resources used by the presently chosen combination versus resources used by suggested alternatives. In particular, specific suggestions for improvement may be presented based on an analysis of the deviations from best practices and the possibility of incorporating best practices in place of current practices. For example, if a particular operation as currently conducted employs a long command length compared to best practices, substitution of the operation as conducted in best practices, or elements of that operation, may be suggested.

At 340, a goal is identified. The goal is associated with performance of the plurality of commands used to achieve the intended result of the business process. In one embodiment, the goal is a best practice for the related industry. Specifically, in relation to commands, a command and its related transactions may be evaluated against other commands and transactions, as a goal, that are used for achieving the same intended result. Evaluation may include determining if transactions can be eliminated, or to reduce the number of transactions in a command, or to use more efficient or less burdensome techniques to perform the transactions in a command.

At 350, an efficiency metric, and more specifically, a performance metric may be determined based on the goal and the losses as defined by the non-value added commands. As described before in relation to FIG. 5, the performance metric helps determine the proficiency of the individual, and helps to identify areas of improvements.

Figure 6:
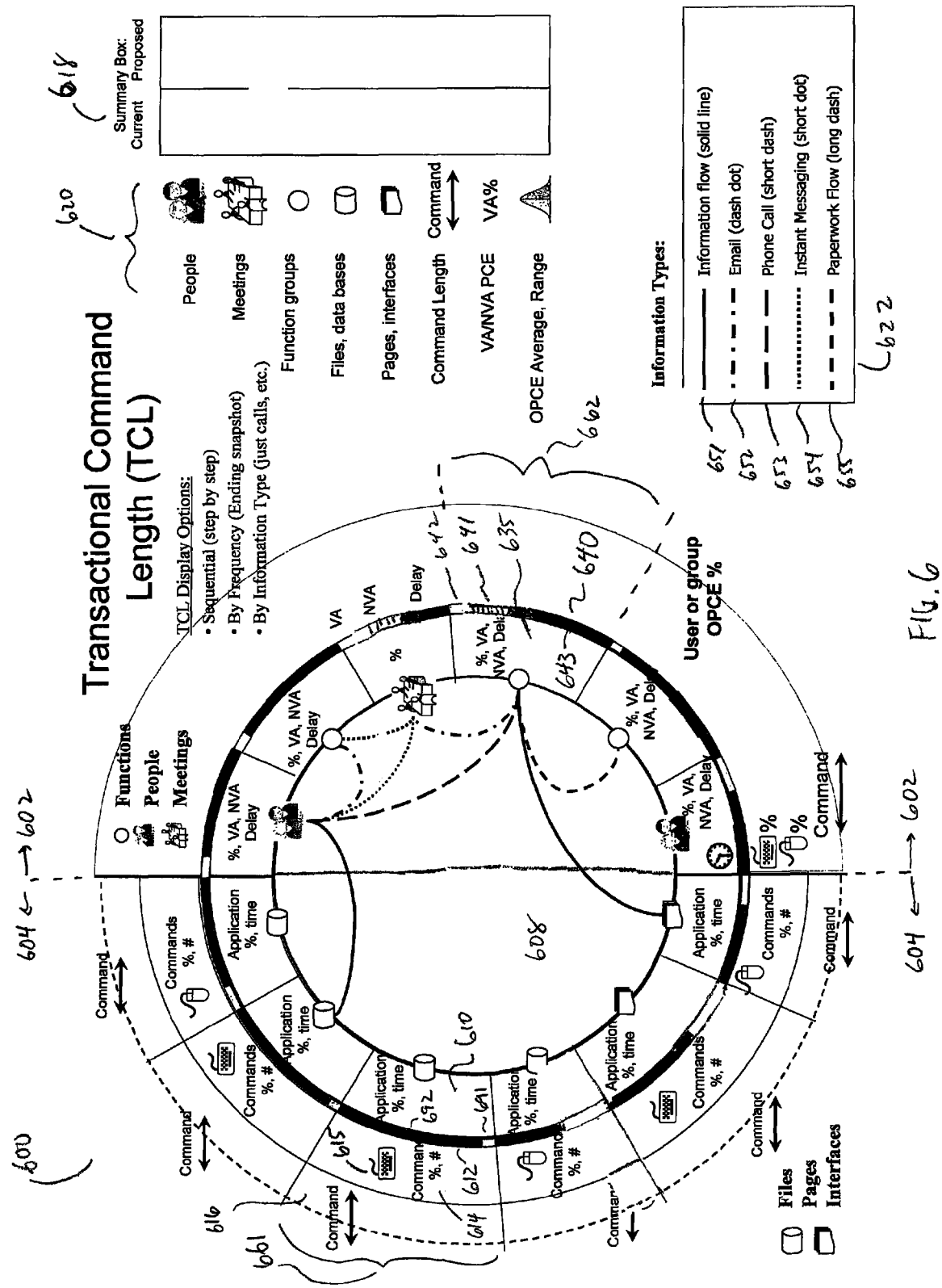
FIG. 6 illustrates a transactional information map used for identifying areas of improvement in an overall business process, in accordance with one embodiment of the present invention.

Turning now to FIG. 6, the results of the analysis performed by the data analysis application 132 of FIG. 1 and flow diagrams 200 and 300 may be presented in graphical format, in accordance with one embodiment of the present invention. FIG. 6 illustrates a transactional command length (TCL) or transaction information map 600, which presents one suitable format that can be used for illustration of information that may be captured by the data capture overlay 130 and analyzed by the data analysis application 132 for presentation of data for an overall business process that involves the use of computing resources. The transaction information map 200 may be displayed by the data analysis application 132 using the display 114, in one embodiment.

Many business processes essentially involve the exchange of information of one kind or another. The transaction information map 600 provides useful information about the efficiency with which exchanges of information are carried out. Among these exchanges may be general exchanges of information, emails exchanged within the organization, approvals, telephone calls, and emails to customers.

The transaction information map 600 illustrated here may suitably categorize information exchanges as belonging to two general types. These include interpersonal exchanges, represented by the right side 602, and the storage and retrievals of information over a local computer system represented by the half 604. Also, left side 604 refers to the location of information in terms of files and databases. In addition, left side 604 also refers to the location of retrieval of information related to the internet, in some embodiments.

More particularly, the left side 604 illustrates exchanges or interactions between persons or operations using data processing equipment. That is, the transactions are associated with interactions with computing resources. On the other hand, on the right side 602 of transaction information map 600, these exchanges may include interactions between persons, such as when performing functions, interacting with groups of persons, or conducting meetings or functions. The names of the various elements are added to the circle as exchanges are made involving them, and lines show the exchanges between elements.

In addition, each of these types of components includes a number of operations and commands, and information related to commands is illustrated in a number of regions, such as a central region 608, a first concentric ring region, a second concentric ring region, and a third concentric ring region.

More specifically, transaction information map 600 illustrates the components involved in performing a business transaction. As previously described, a business transaction may involve any number of steps or components. Using a previous example, a business process of processing an ECN may consist of the following broad steps, or components: a) order receipt A-410 and order triage A-415; b) route to proper engineering department B-420; c) complete engineering quote C-425; d) obtain customer approval D-430; e) make engineering change E-435 and verify by legal department E-440; and prepare print for mail F-445 and mail print to customer F-450. In addition, transaction information map 600 may represent transactions involved in one components of the ECN business process, such as transactions involved in performing the pull prints step 462 of FIG. 4B, which is further described in relation to FIGS. 4C and 7, below.

Each of these steps or components can be illustrated as a node or radial section in the transaction information map 600. For instance, on the right side 602 of transaction information map 600, radial section or node 662 illustrates a person to person contact, such as those performed in obtaining customer approval at component D-430. Information included in node 662 relates to the efficiency metrics calculated using the methods of FIGS. 2 and 3 for a particular individual associated with node 662, as will be described below. In addition, on the left side 604 of transaction information map 600, radial section or node 661 illustrates the use of a particular application (e.g., form request application), such as the application used to make the engineering change in component E-435. Information is included in node 661 relating to the efficiency metrics calculated using the methods of FIGS. 2 and 3 for an individual using the application associated with node 661, as will be described below.

Looking at transaction information map 600, the central region 608 illustrates each type of information exchange under examination. That is, lines are drawn between nodes that indicate the type of information being transferred or that is in association between the nodes. For instance, the information types of the lines may include email communication 652 or phone call 653, as provided in legend 622.

In addition, these lines may be drawn sequentially, indicating the order of performance of components in a business process. Further, the lines may indicate the frequency of use of a particular node, in another embodiment. For instance, the use of a particular application may be featured, such as the application associated with node 661. As such, information in central region 608 would include lines between node 661 and any other node in map 600. In still another embodiment, the information in central region 608 may be filtered by information type. That is, only information related to a particular information type (e.g., email communication 652) would be shown in central region 608.

The first concentric ring borders the central region 608. The first concentric ring can be further described in relation to the left side 604 and the right side 602 of map 600.

On the left side 604 of map 600, the region 610 of node 661 is representative of information illustrated in the first concentric ring throughout transaction information map 600. In general, region 610 includes information such as the name of the application associated with region 610, the percentage of time spent using the application, and a translation into time units spent using the application.

For instance, the region 610 illustrates the various computer applications used, such as Word, Excel, Outlook, and the like, for example, in the case of automated processes. Each segment of the first concentric ring (e.g., region 610) on the left side 604 illustrates the name of an application, the proportion of total activity involving the use of the application, and percentage of total time of the process involving the application, in the case of automated activities. Further, each segment of the first concentric ring (e.g., region 610) may suitably be sized according to the proportionate use of the application illustrated by the segment, in one embodiment. In another embodiment, each segment of the region also indicates the time devoted to the activity. Furthermore, an OPCE metric or calculation is also presented in region 610. For instance, the OPCE metric related to the use and performance of various transactions involving the associated application of node 661 is presented in region 610.

On the right side 602 of map 600, region 635 illustrates information provided in the first concentric ring of node 662. The information is related to the various activities undertaken, such as functions, human interactions, and meetings, in the case of tasks, transactions, components of business processes that are not conducted by automated means. Information provided includes a list of value added transactions, and a list of non-value added transactions. Also, delay time is included that illustrates the delay in performing the activity associated with the transaction. For instance, the delay in receiving information critical in completing a task for the component associated with node 662 is presented in this region 635. For instance, the delay may be representative of time waiting for another individual to produce necessary data. In addition, the delay may be further illustrated in the second concentric ring, as presented in region 643, which indicates the delay time referenced against the total time associated with the component of node 662. Also, an OPCE rating may be included for the individual associated with a particular node, in one embodiment.

The second concentric ring borders the first concentric ring. The second concentric ring can be further described in relation to the left side 604 and the right side 602 of transaction information map 600. More particularly, for both the left side 604 and right side 602 of map 600, the second concentric ring illustrates the value added/non value added band, illustrating the time devoted in each application to value added activities, as well as, non value added activities. The time allocations may be indicated by differentiated by color coding, or by hashing. For example, white color indicates the proportion devoted to value added activities and dark color indicates the proportion devoted to non value added activities.

As a representative example, on the left side 604, the second concentric ring is described by representative region 612 of node 661. For instance, the white colored region 691 indicates the amount of time spent performing value added transactions necessary to complete the transaction associated with node 661. On the other hand, the dark colored region 692 indicates the amount of time spent performing non value added transactions that were not necessary to complete the transaction associated with node 661.

On the right side 602 of map 600, the second concentric ring is described by representative region 640 of node 662. As described previously, region 640 illustrates time spent performing value added activities and non-value added activities, as well as the delay experienced in performing the associated task. For instance, white colored region 642 indicates the time spent performing value added activities. Also, hashed region 641 indicates the time spent performing non-value added activities. Dark colored region 643 indicates the time spent experiencing delays.

The third concentric ring borders the second concentric ring. The third concentric ring is presented on left side 604 of map 600 and is related to automated processes conducted in performance of the business process. As a representative example, region 614 of node 661 is described illustrating the information provided in the third concentric ring.

The third concentric ring, as represented by region 614, illustrates command types, showing the primary command used in each application, such as cut, paste, change sheet, and other commands, along with the percentage and frequency of use. The primary method of input used for the command type may be illustrated by an illustrated icon, for example, the icon 615 illustrating a keyboard as a primary input method for a particular application associated with node 661. As noted above, identification of the input method that is used provides useful information relating the efficiency of information entry. Typically, the mouse is the least efficient method of entering information, and identification of the mouse as the input method identifies an important avenue for possible improvement in efficiency.

The fourth concentric ring borders the third concentric ring. The fourth concentric ring is presented on the left side 604 of map 600 and is related to automated processes conducted in performance of the business process. As a representative example, region 616 of node 661 is described illustrating the information provided in the fourth concentric ring.

In particular, the fourth concentric ring, as represented by region 616, illustrates command length, that is, the total number of commands that have been executed for each application. That is, information provided includes the number of commands performed to complete the transactions associated with node 661.

In addition, the TCL map 600 presents an analysis result section 618, presenting descriptions and evaluations of activities as they are currently conducted, along with the various types of activities. Activities are illustrated by the legend 620. In addition, the TCL map 600 presents a legend 622, defining the appearances of the various lines used to illustrate information flows. For instance, the information flows may indicate the flow of information, in general 651, through email 652, phone 653, instance messaging 654, and paperwork 655.

The section 618 is of particular importance because it presents areas of opportunity for improvement through comparison of the "current" and "proposed" data. Suitably, the proposed data may be assembled by expert analysts or by teams of subject matter experts. In the present example, the section 618 presents areas for current and proposed data for human interactions, email, telephone calls, instant messaging, meetings, local files, remote pages and interfaces, value added percentage, and user group variation. Suitably, once data has been collected and analyzed for a particular business process or group of business processes, values characterizing current practices and values characterizing proposed practices are presented for comparison. Proposed practices may be best practices, or may be practices that do not rise to the level of best practices for one reason or another, such as difficulty of implementation, but which typically represent an improvement over current practices. In addition, an overall value representing deviation from best practices is presented for current and proposed practices, in order to provide a comprehensive overview of the current deviations from maximum efficiency and the gains offered by the proposed improvements.

Figure 7:
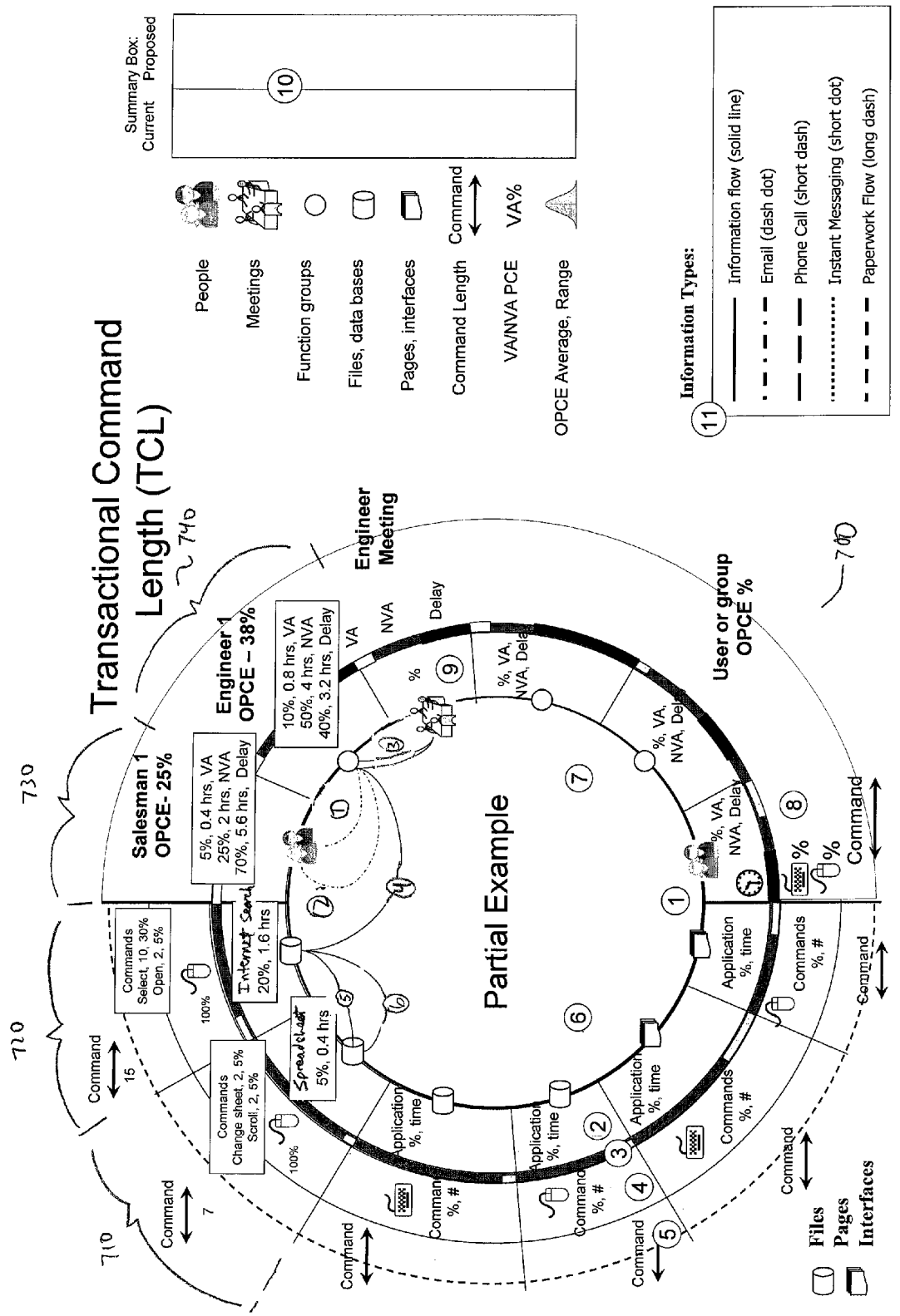
FIG. 7 is a transaction information map 700 illustrating various information gathered for determining OPCE efficiency metrics for the command steps listed in FIG. 4C.

FIGS. 4C and 7 in combination illustrate a particular application of the transaction information map in relation to a particular step of a component, in accordance with embodiments of the present invention. For instance, FIG. 4C is a chart listing the command steps of a transaction of the ECN business process 400, in accordance with one embodiment of the present invention.

FIG. 7 is a transaction information map 700 illustrating various information gathered for determining OPCE efficiency metrics for the command steps listed in FIG. 4C. More particularly, transaction information map 700 illustrates the sequential flow of information when performing the transaction of ECN business process 400. The flow of information includes individuals, such as Salesman 1, and Engineer 1. Various information is provided for Salesman 1 in radial section or node 730. Various information is also provide for Engineer 1 in node 740. In addition, the flow of information includes the use of two applications, such as an internet search application, and a spreadsheet application. Information is provided for the internet search application in node 720. Also, information is provided for the spreadsheet application in node 710.

As shown in FIG. 4C, chart 400C lists the command steps involved when performing transaction 462, which involves pulling prints. Transaction 462 involves six steps to complete in order to pull prints. These steps can be further categorized as involving automatic processes, or non-automated processes.

For instance, the first group of steps 470 includes steps 1-3 and involve non-automated processes. These three steps are also shown in FIG. 7. Step 1 is described as involving a communication between Engineer 1 and Salesman 1, that is initiated by Engineer 1 to get a customer name that is requesting the change notice. Step 2 is the return communication from Salesman 1 and Engineer 1, that provides the customer name to Engineer 1. Step 3 is the participation of Engineer 1 in a meeting of a group of engineers. The activities and transactions involved in these steps are attributed to each of the nodes individually. For example, at step 1, the act of communication and the time involved in that activity is attributed to both Salesman 1 and Engineer 1 for purposes of determining the efficiency of performing the business process involved in transaction 462.

The second group of steps 475 includes steps 4-6 and involve automated processes, and more specifically, involve the use of two applications: an internet search application, and a spreadsheet application, as previously described. FIG. 4C provides detailed information regarding each of the commands involved in performing each of the steps.

Step 4 involves an interaction with the internet search application, and is shown in FIG. 7 as connecting Engineer 1 at node 740 with the internet search application at node 720. That is, Engineer 1 is interfacing with the internet search application. As shown in FIG. 4C, eight commands are involved in step 4. All of the commands involve the mouse, and as such are categorized as being non-value commands. In addition, each of the commands can be further compartmentalized for purposes of identifying transactional losses and improving performance. For instance, six of the eight commands involve a selection process. For example, this information may provide additional insight as to which commands are more relied upon by a particular individual.

Step 5 involves interactions with the spread sheet application, and is shown in FIG. 7 as connecting the internet search application at node 720 with the spreadsheet application at node 710. That is, Engineer 1 is transitioning from the internet search application to the spread sheet application. As shown in FIG. 4C, seven commands are involved in step 5. Again, all of the commands involve the use of the mouse. It has been determined that six of the seven commands are non-value added commands, and one command is a value added command.

Step 6 involves interactions with the internet search application, and is also shown in FIG. 7 as connecting the spreadsheet application at node 710 with the internet search application at node 720. That is, Engineer 1 is transitioning back from the spreadsheet application to the internet search application. As shown in FIG. 4C, seven commands are involved in step 6, and all involve the use of the mouse. It has been determined that six of the seven commands are non-value added commands, and one command is a value added command.

As a result, in transaction 462, a total of twenty-two commands are performed to pull prints. Two of the commands are determined to be value added commands. Twenty of the commands are determined to be non-value added commands.

Additionally, FIG. 7 provides information related to each of the nodes that are involved in completing transaction 462. For instance, as shown in node 710, information for the spreadsheet is provided. This information includes the name of the spreadsheet application, and the time involved using this application, at 0.4 hours. A percentage of the total time spent performing transaction 462 that involves the spreadsheet application is also provided, at 5%. In addition, commands of greatest frequency are listed. For instance, the change sheet command is performed two times for a total of 5% of the commands. Also, the scroll command is performed twice for a total of 5% of the commands. In addition, a total command length of seven is presented in node 710.

Also, information is provided of the internet search application. As shown in node 720, this information includes the name of the internet search application, and the time involved using this application, at 1.6 hours. A percentage of the total time spent performing transaction 462 that involves the internet search application is also provided, at 20%. In addition, commands of greatest frequency are listed. For instance, the select command is performed ten times for a total of 30% of the commands. Also, the open command is performed twice for a total of 5% of the commands. In addition, a total command length of fifteen is presented in node 710.

Pertinent information is also provided for Salesman 1 at node 730. For instance, information for performing value added and non-value added activities is provided. Specifically, 0.4 hours is spent performing value added activities. Also, 2 hours is spent performing non-value added activities. In addition, delay time is presented and totals 5.6 hours. As such, a percentage of time spent for each type of activity can be presented, as follows: 5% for value added activities; 25 percent for non-value added activities; and 70% spent for delay, such as waiting for a response.

Pertinent information is also provided for Engineer 1 at node 740. For instance, information performing value added and non-value added activities is provided. Specifically, 0.8 hours is spent performing value added activities. Also, 4.0 hours was spent performing non-value added activities. In addition, delay time is presented and totals 3.2 hours. As such, a percentage of time spent for each type of activity can be presented, as follows: 10% for value added activities; 50% for non-value added activities; and 40% spent associated with delays, such as waiting for a response.

The information provided in transaction information map 700 is used to provide suggestions as to how to improve performance. In particular, the information may lead to suggestions as to the layout of desktop windows open to various applications used in a business process, in accordance with one embodiment of the present invention. For instance, the information found on the left side of transactions maps 600 and 700 pertaining to transactions involving automated activities is used. Specifically, a total time and a percentage of total time spent using various applications is presented. In a representative example, it is found that three applications are used primarily in a business process. These three applications involve the use of an internet search engine, a spreadsheet application, and a specific file in a word processing document, then it can be determined which windows in a desktop should be opened, and which windows should not be opened when performing the business process. For instance, it may be determined that windows for each of the three applications be opened when performing the business process. A specific layout of the three windows can also be determined, depending on user preference.

Accordingly, embodiments of the present invention are capable of identifying components of a business process, evaluating instances or tasks of the components with respect to their efficiency and value added status, and refining the tasks within a components and their organization to increase the efficiency of performing the component by selecting the most advantageous tasks available to accomplish the component, including minimizing or reducing the use of tasks that do not add value to the overall business process.

While the methods of embodiments illustrated in flow diagrams 2 and 3 show specific sequences and quantity of operations, the present invention is suitable to alternative embodiments. For example, not all the operations provided for in the methods presented above are required for the present invention. Furthermore, additional operations can be added to the operations presented in the present embodiments. Likewise the sequences of operations can be modified depending upon the application.

A method and system for identifying transactional losses for purposes of improving business processes is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

I claim:

1. A method of identifying losses in a transactional environment, said method comprising:
providing a computer system;
providing at least one software application for operation on said computer system;
identifying a business process having a plurality of at least three tasks, a performance of said plurality of tasks leading to an intended result, said plurality of tasks including:
at least one automated task to be completed using said software application on said computer system; and
at least one non-automated task for completion separate from said computer system;

causing a user to perform each of said plurality of tasks to achieve said intended result;

recording on said computer system transactional information relating to each of said plurality of tasks, said transactional information including:

a plurality of computer commands executed by said user when performing said at least one automated task, said computer commands being automatically captured by said computer system; and data reflective of said at least one non-automated task, said data being uploaded separately into said computer system;

operating said computer system to identify a plurality of non-value added transactional events from said transactional information, each of said non-value added transactional events being unnecessary to achieve said intended result;

operating said computer system to associate each of said non-value added transactional events with at least one of a plurality of loss categories; wherein said loss categories include at least one of availability, performance and yield, and operating said computer system to calculate an efficiency metric reflective of said performance of said business process by said user wherein calculating said efficiency metric comprises:

calculating an availability metric based on a percentage of said non-value added transactional events associated with an availability of said user;

calculating a performance metric based on a percentage of said non-value added transactional events associated with a performance of said user;

calculating a yield metric based on a percentage of said non-value added transactional events associated with an accuracy of said user; and multiplying together said availability metric, said performance metric and said yield metric to determine said efficiency metric and wherein said efficiency metric is included in a transactional command length map that describes the efficiency of said business process.

2. The method of claim 1, wherein automatically capturing said plurality of computer commands comprises collecting key stroke activity related to said computer system.

3. The method of claim 1, wherein automatically capturing said plurality of computer commands comprises collecting live video of screen activity related to said computer system.

4. The method of claim 1, wherein automatically capturing said plurality of computer commands comprises collecting information from a human interface device.

5. The method of claim 1, wherein uploading data reflective of said at least one non-automated task comprises manually inputting said data into said computer system.

6. The method of claim 1, further comprising converting each of said plurality of non-value added transactional events into a lost time basis.

7. The method of claim 1, further comprising identifying each of said plurality of non-value added transactional event as a function of quality.

8. The method of claim 1, wherein said business process is repeatable to obtain similar intended outcomes as said intended outcome.

9. The method of claim 1, further comprising calculating said efficiency metric for each additional user performing said business process.

10. A method of identifying losses in a transactional environment, said method comprising:

providing a computer system;

providing at least one software application for operation on said computer system;

identifying a business process having a plurality of at least three tasks, a performance of said plurality of tasks leading to an intended result, said plurality of tasks including at least one automated task for completion using said software application on said computer system;

causing a first user to perform said automated task using said software application on said computer system;

recording on said computer system a first plurality of computer commands executed by said first user to perform said automated task on said computer system;

identifying at least one value added computer command from said first plurality of computer commands, said value added command being necessary to achieve said intended result;

identifying at least one non-value added computer command from said first plurality of computer commands, said non-value added command being unnecessary to achieve said intended result;

identifying a modified plurality of computer commands used for performing said automated task that eliminates said at least one non-value added computer command;

causing a second user to perform said automated task using said software application on said computer system;

recording on said computer system a second plurality of computer commands executed by said second user while performing said automated task on said computer system;

operating said computer system to compare said second plurality of computer commands against said modified plurality of computer commands; and operating said computer system to calculate an efficiency metric reflective of said performance of said automated task by said second user wherein calculating said efficiency metric comprises:

calculating an availability metric based on a percentage of said non-value added transactional events associated with an availability of said user;

calculating a performance metric based on a percentage of said non-value added transactional events associated with a performance of said user;

calculating a yield metric based on a percentage of said non-value added transactional events associated with an accuracy of said user; and multiplying together said availability metric, said performance metric and said yield metric to determine said efficiency metric and wherein said efficiency metric is included in a transactional command length map that describes the efficiency of said business process.

11. The method of claim 10, wherein calculating said efficiency metric further comprises comparing said modified plurality of computer commands to a best practice model for performing said business process.

12. The method of claim 1, wherein said non-value added transactional events associated with said availability loss category are selected from a group comprising essentially of:

time devoted to performing activities away from said business process;

time lost for interruptions;

system and network downtime; and unavailability of human interface devices.

13. The method of claim 1, wherein said non-value added transactional events associated with said performance loss category are selected from a group comprising essentially of:

application searching activities;

words per minute ratings;
mouse usage;
voice input losses; and
training skill competency level.

14. The method of claim 1 wherein said non-value added transactional events associated with said yield loss category are selected from a group comprising essentially of:
error loops; and
inspection loops.

15. A method of identifying losses in a transactional environment, said method comprising:
providing a computer system;
providing at least one software application for operation on said computer system;
identifying a business process having a plurality of at least three tasks, a performance of said plurality of tasks leading to an intended result, said plurality of tasks including:
at least one automated task for completion using said software application on said computer system; and
at least one non-automated task for completion separate from said computer system;
causing a user to perform each of said plurality of tasks to achieve said intended result;
recording on said computer system a first plurality of transactional events relating to each of said plurality of tasks, said first plurality of transactional events including:
a plurality of computer commands executed by said user when performing said at least one automated task, said computer commands being automatically captured by said computer system; and
data reflective of said at least one non-automated task, said data being uploaded separately into said computer system;
identifying a plurality of value added transactional events from said first plurality of transactional events, said value added transactional events being necessary to achieve said intended result;
identifying a plurality of non-value added transactional events from said first plurality of transactional events, each of said non-value added transactional events being unnecessary to achieve said intended result;
operating said computer system to calculate a first efficiency metric, said first efficiency metric defining a performance of said business process by said user;
identifying a second plurality of transactional events used for performing said automated task that eliminates said at least one of said non-value added transactional events;
operating said computer system to calculate a second efficiency metric based on said second plurality of transactional events; and
comparing said first efficiency metric against said second efficiency metric to determine a target improvement in performance of said business process wherein identifying a plurality of non-value added transactional events further comprises associating each of said non-value added transactional events with at least one of a plurality of loss categories selected from the group consisting of an availability metric of said user, a performance metric of said user and an accuracy metric of said user
and
multiplying together said availability metric, said performance metric and said yield metric to determine said efficiency metric and wherein said efficiency metric is included in a transactional command length map that describes the efficiency of said business process.

16. The method of claim 15, wherein determining said efficiency metric further comprises:
calculating an availability metric based on a percentage of said non-value added transactional events associated with said availability of said user;
calculating a performance metric based on a percentage of said non-value added transactional events associated with said performance of said user;
calculating a yield metric based on a percentage of said non-value added transactional events associated with said accuracy of said user; and
multiplying together said availability metric, said performance metric and said yield metric to determine said efficiency metric.

17. The method of claim 16, wherein said non-value added transactional events associated with said availability of said user are selected from a group comprising essentially of:
time devoted to performing activities away from said business process;
time lost for interruptions;
system and network downtime; and
unavailability of human interface devices.

18. The method of claim 16, wherein said non-value added transactional events associated with said performance of said user are one or more members selected from the group consisting of:
application searching activities;
words per minute ratings;
mouse usage;
voice input losses; and
training skill competency level.

19. The method of claim 16, wherein said non-value added transactional events associated with said yield of said user are one or more members selected from the group consisting of:
error loops; and
inspection loops.

20. The method of claim 1, wherein said availability metric comprises at least one of percent dedicated to task, interruption/distractions, system performance, and human interface devices availability, said performance metric comprises at least one of paging, scrolling, searching, words per minute typing, mouse versus shortcut, training skill competency, and voice input, said yield comprises at least one of errors and rework loops, inspection rework and approvals, and scrap.

21. The method of claim 10, wherein said availability metric comprises at least one of percent dedicated to task, interruption/distractions, system performance, and human interface devices availability, said performance metric comprises at least one of paging, scrolling, searching, words per minute typing, mouse versus shortcut, training skill competency, and voice input, said yield comprises at least one of errors and rework loops, inspection rework and approvals, and scrap.

22. The method of claim 15, wherein said availability metric comprises at least one of percent dedicated to task, interruption/distractions, system performance, and human interface devices availability, said performance metric comprises at least one of paging, scrolling, searching, words per minute typing, mouse versus shortcut, training skill competency, and voice input, said yield comprises at least one of errors and rework loops, inspection rework and approvals, and scrap.

* * * * *